(12) United States Patent
Geibel et al.

(10) Patent No.: US 9,779,008 B2
(45) Date of Patent: Oct. 3, 2017

(54) FILE MONITORING

(75) Inventors: Jonathan Eric Geibel, Burbank, CA (US); Jeffrey M. Jordan, Valley Village, CA (US); Scott Lane Burris, Palmdale, CA (US); Kevin Christopher Constantine, Sherman Oaks, CA (US); Thomas Charles Greer, Palmdale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 728 days.

(21) Appl. No.: 13/401,801

(22) Filed: Feb. 21, 2012

(65) Prior Publication Data

US 2013/0219049 A1 Aug. 22, 2013

(51) Int. Cl.
*G06F 11/34* (2006.01)
*G06F 11/32* (2006.01)

(52) U.S. Cl.
CPC ........ *G06F 11/3433* (2013.01); *G06F 11/323* (2013.01); *G06F 11/3495* (2013.01)

(58) Field of Classification Search
CPC .. G06Q 30/02; G06Q 30/0201; H04N 21/812; G06F 3/0608; G06F 3/0685; Y10S 707/99955
USPC .................. 726/4, 22; 725/22, 9, 5, 39, 32; 709/225, 224, 223, 226; 706/55, 54; 707/E17.01, 999.204; 711/161
See application file for complete search history.

(56) References Cited

U.S. PATENT DOCUMENTS

| | | | | | |
|---|---|---|---|---|---|
| 5,367,698 | A | * | 11/1994 | Webber | G06F 17/30079 707/E17.01 |
| 5,564,037 | A | * | 10/1996 | Lam | 711/161 |
| 5,995,490 | A | * | 11/1999 | Shaffer | H04L 12/5695 348/14.08 |
| 8,280,853 | B1 | * | 10/2012 | Lai | G06F 17/30073 707/651 |
| 8,825,591 | B1 | * | 9/2014 | Lai | G06F 17/30073 707/602 |
| 2004/0010654 | A1 | * | 1/2004 | Yasuda | G06F 3/0607 711/1 |
| 2006/0149748 | A1 | * | 7/2006 | Yamakawa | G06F 17/30079 |
| 2007/0078972 | A1 | * | 4/2007 | Yagishita | G06F 17/30079 709/224 |
| 2008/0222286 | A1 | * | 9/2008 | Plumpton | G06F 11/3419 709/224 |
| 2009/0044024 | A1 | * | 2/2009 | Oberheide | G06F 21/562 713/188 |
| 2009/0094247 | A1 | * | 4/2009 | Fredlund | H04N 1/00153 |
| 2009/0150477 | A1 | * | 6/2009 | McClanahan | G06F 17/30132 709/203 |

(Continued)

*Primary Examiner* — Ninos Donabed
(74) *Attorney, Agent, or Firm* — Patent Ingenuity, P.C.; Samuel K. Simpson (57) ABSTRACT

A server receives a first set of file activity data from a first file monitor. The first set of file activity data indicates activity associated with a first set of files accessed at a first compute node in communication with a network. Further, the server receives a second set of file activity data from a second file monitor. The second set of file activity data indicates activity associated with a second set of files accessed at a second compute node in communication with the network. In addition, the server aggregates the first set of file activity data and the second set of file activity data into an aggregated set of network file activity data.

28 Claims, 6 Drawing Sheets

(56) References Cited

U.S. PATENT DOCUMENTS

2009/0150533 A1\* 6/2009 McClanahan ..... G06F 17/30194
                                                    709/223
2009/0228669 A1\* 9/2009 Slesarev et al. ............. 711/161
2010/0191612 A1\* 7/2010 Raleigh .......................... 705/26
2010/0251363 A1\* 9/2010 Todorovic ............... G06F 21/53
                                                    726/22

\* cited by examiner

FILE MONITORING

BACKGROUND

1. Field

This disclosure generally relates to the field of computer systems. More particularly, the disclosure relates to file monitoring.

2. General Background

A computer network may include a large number of computing devices, such as servers, that communicate with other computing devices, such as clients, to provide services to the clients. Many network configurations involve some servers that are more actively utilized than other servers. As a result, some servers may be so overutilized that some users experience difficulty accessing such servers. Further, other servers may be underutilized. Current approaches do not adequately provide data about the status of the network utilization. As a result, issues such as overutilization of a server may not be discovered until after hardware problems, processing delays, or the like are discovered.

SUMMARY

In one aspect of the disclosure, a computer program product is provided. The computer program product includes a computer readable medium having a computer readable program stored thereon. The computer readable program when executed on a computer causes the computer to receive, at a server, a first set of file activity data from a first file monitor. The first set of file activity data indicates activity associated with a first set of files accessed at a first compute node in communication with a network. Further, the computer readable program when executed on the computer causes the computer to receive, at the server, a second set of file activity data from a second file monitor. The second set of file activity data indicates activity associated with a second set of files accessed at a second compute node in communication with the network. In addition, the computer readable program when executed on the computer causes the computer to aggregate, at the server, the first set of file activity data and the second set of file activity data into an aggregated set of network file activity data.

In another aspect of the disclosure, a process is provided. The process receives, at a server, a first set of file activity data from a first file monitor. The first set of file activity data indicates activity associated with a first set of files accessed at a first compute node in communication with a network. Further, the process receives, at the server, a second set of file activity data from a second file monitor. The second set of file activity data indicates activity associated with a second set of files accessed at a second compute node in communication with the network. In addition, the process aggregates, at the server, the first set of file activity data and the second set of file activity data into an aggregated set of network file activity data.

In yet another aspect of the disclosure, a system is provided. The system includes a server that receives a first set of file activity data from a first file monitor, receives a second set of file activity data from a second file monitor, and aggregates the first set of file activity data and the second set of file activity data. The first set of file activity data indicates activity associated with a first set of files accessed at a first compute node in communication with a network. The second set of file activity data indicates activity associated with a second set of files accessed at a second compute node in communication with the network.

In another aspect of the disclosure, a computer program product is provided. The computer program product includes a computer readable medium having a computer readable program stored thereon. The computer readable program when executed on a computer causes the computer to monitor, with a file monitor, a set of file activity data that indicates activity associated with a set of files accessed at a compute node in communication with a network. Further, the computer readable program when executed on the computer causes the computer to send, from the file monitor, the set of file activity data to a server that aggregates the set of file activity with at least one additional set of file activity data received from at least one additional file monitor. The at least one additional set of file activity data indicates activity associated with an additional set of files accessed by at least one additional compute node.

In yet another aspect of the disclosure, a process is provided. The process monitors, with a file monitor, a set of file activity data that indicates activity associated with a set of files accessed at a compute node in communication with a network. Further, the process sends, from the file monitor, the set of file activity data to a server that aggregates the set of file activity data with at least one additional set of file activity data received from at least one additional file monitor. The at least one additional set of file activity data indicates activity associated with an additional set of files accessed by at least one additional compute node.

In another aspect of the disclosure, a system is provided. The system includes a processor that monitors, with a file monitor, a set of file activity data that indicates activity associated with a set of files accessed at a compute node in communication with a network and sends, from the file monitor, the set of file activity data to a server that aggregates the set of file activity with at least one additional set of file activity data received from at least one additional file monitor. The at least one additional set of file activity data indicates activity associated with an additional set of files accessed by at least one additional compute node.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A file monitor may be utilized to monitor file activity on a host compute node. The file monitor may be a set of code, a client, or the like. A host compute node may be a computing device, a program executed on a computing device, an operating system, a function, or the like. The file monitor tracks the file activity on the host compute node. An example of file activity is an operation, e.g., a read or a write, performed on an open file. In one aspect, there are a plurality of host compute nodes, where each node has a file monitor. Each of the file monitors may send the respective gathered file activity to a centralized server. The file activity may include local file activity and/or network file activity. Local file activity may involve activity associated with files stored on a local storage device of the host compute node. Network file activity may include activity associated with files that the host compute node is utilizing, but that are stored externally on an external storage device that is accessed by the host compute node via a network. In yet another aspect, an application programming interface ("API") may be utilized by an application to access the aggregated file activity at the centralized server.

Accordingly, performance visualization may be achieved through a real-time graphical view of the file activity, i.e., local file activity and/or network file activity, occurring on different host compute nodes in a network. Various information may be provided to a user through a GUI. As an example, file activity by a particular user or a particular group of users may be viewed. Further, as an example, file activity by file type may be viewed. In addition, as another example, file activity per directory path may be viewed. As yet another example, various types of network traffic may be viewed. The network traffic may include server traffic, client traffic, read traffic, write traffic, or the like. For instance, the network file activity aggregated from a plurality of host compute nodes on a network may indicate a total number of files that are open on a network and where those files are located. Accordingly, if the server storing those files is having performance issues, the graphical view of the file activity may help determine how to solve such performance issues. As an example, an analysis may be performed to determine various patterns, e.g., files that are open by a large quantity of clients, a set of clients that is producing a higher load than others, or the like.

The data aggregated at the centralized server may also allow data to be migrated in real-time without affecting end users. Since the aggregated data helps determine whether or not a file or directory is open anywhere on a network, files may be migrated after a determination that the files are not open by any user on the network. As a result, data migration may be automated. Accordingly, the manual labor typically involved in scheduling data migrations may be reduced.

In contrast with funneling the network file activity data through a single hardware device, which may be dependent on a platform with a particular protocol, the data is sent directly from the clients on the host compute nodes to the centralized server. For example, a plurality of file monitors that are each on a host compute node utilizing a different operating system may each directly send data to the centralized server. Further, the centralized server may send queries to each of the file monitors. The file monitors may each have the capability of communicating with the centralized server and their respective host compute node. As a result, file activity data may be aggregated in a technology independent manner. In other words, file activity data may be aggregated without reliance on any particular platform, operating system, file system, network technology, or the like.

Figure 1:
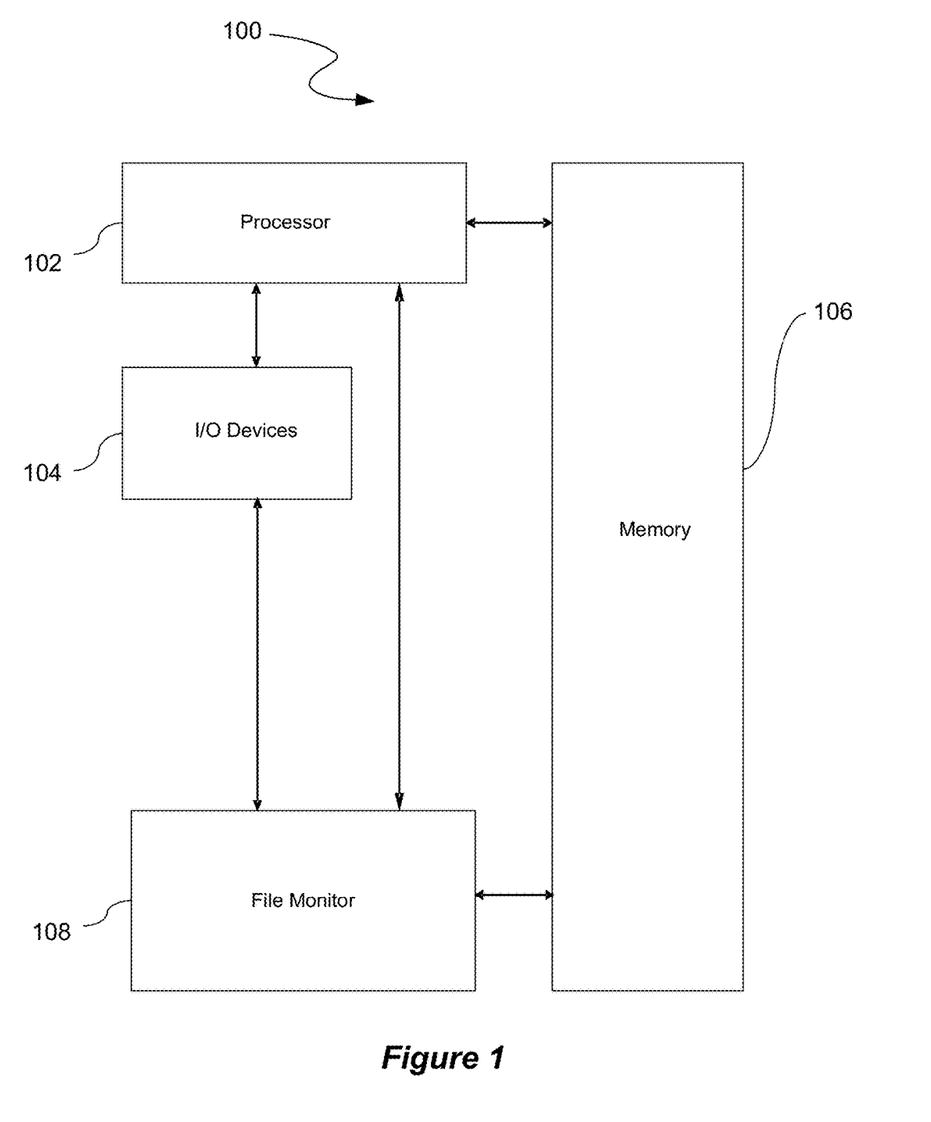
FIG. 1 illustrates a system that may be utilized to perform file monitoring.

FIG. 1 illustrates a system 100 that may be utilized to perform file monitoring. In one aspect, the system 100 is implemented utilizing a general purpose computer or any other hardware equivalents. Thus, the system 100 comprises a processor 102, a memory 106, e.g., random access memory ("RAM") and/or read only memory (ROM), a file monitor 108, and various input/output devices 104, (e.g., audio/video outputs and audio/video inputs, storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands)). In one aspect, the file monitor 108 is implemented as a module. Various other configurations for the file monitor 108 may be utilized.

It should be understood that the file monitor 108 may be implemented as one or more physical devices that are coupled to the processor 102. For example, the file monitor 108 may include a plurality of modules. Alternatively, the file monitor 108 may be represented by one or more software applications (or even a combination of software and hardware, e.g., using application specific integrated circuits (ASIC)), where the software is loaded from a storage medium, (e.g., a magnetic or optical drive, diskette, or non-volatile memory) and operated by the processor 102 in the memory 106 of the system 100. As such, the file monitor 108 (including associated data structures) of the present disclosure may be stored on a computer readable medium, e.g., RAM memory, magnetic or optical drive or diskette and the like.

The system 100 may be utilized to implement any of the configurations herein. In another aspect, the processor 102 is the file monitor 108. Accordingly, in such an aspect, a file monitor 108 that is separate from the processor 102 is unnecessary. FIG. 1 provides an example of an implementation of file monitoring. However, the file monitoring system is not limited to any particular model and may be implemented with similar and/or different components from this example.

The file monitors, compute nodes, and other elements described herein may be used to generate or modify an image or a sequence of images for an animation. For example, the elements described herein may be used for modeling objects (shaping geometry), layout, rigging, look development, stereoscopic creation and manipulation (depth perception), animation (movement, computational dynamics), lighting, rendering, and/or color correction.

Figure 2:
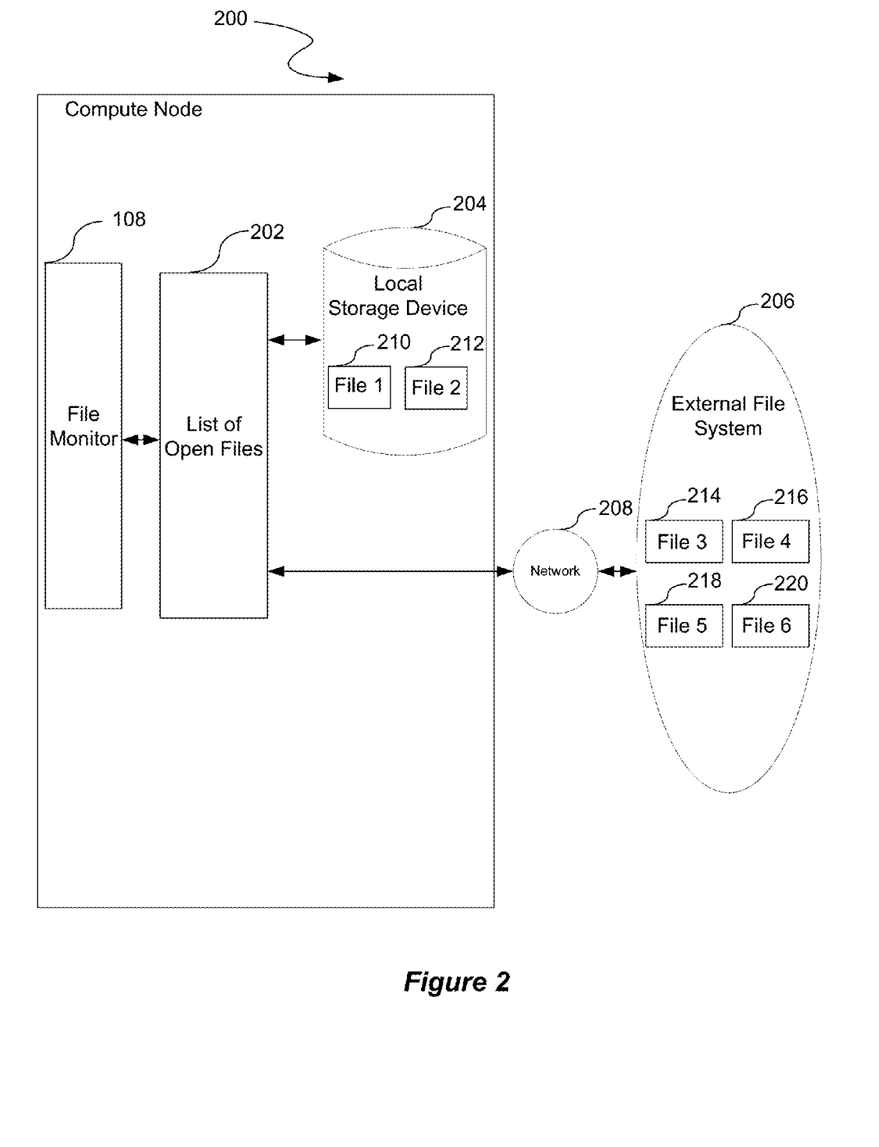
FIG. 2 illustrates an example of a compute node.

The file monitor 108 of the system 100 illustrated in FIG. 1 may perform file monitoring for a compute node. FIG. 2 illustrates an example of a compute node 200. The compute node 200 may store a list 202 of open files that is monitored by the file monitor 108. The files may be stored on a local storage device 204 and/or an external file system 206. The local storage device 204 may be locally connected to the compute node 200. In one aspect, the local storage device 204 may be an internal component of the compute node 200. In another aspect, the local storage device 204 may be external to the compute node 200, but operably connected to the compute node 200 through a local connection. The external file system 206 may be a network storage device that stores files, which are accessed by the compute node 200 and/or other compute nodes via a network 208. As an example, the external file system 206 may be a network-attached storage ("NAS"), which is connected to the network 208 to provide file storage to the compute node 200 and other compute nodes. The NAS may be a file server that is utilized primarily for storing files for access by compute nodes. Various network file sharing protocols may be utilized by the external file system 206.

Although a single external file system 206 is illustrated in FIG. 2, a plurality of external file systems may be utilized for any of the configurations provided for herein. For example, multiple NAS devices may be utilized for any of the configurations provided for herein.

As an example, the local storage device 204 may locally store a first file 210 and a second file 212. Further, the external file system may store a third file 214, a fourth file 216, a fifth file 218, and a sixth file 220. A small number of files is provided for illustrative purposes as the data storage device 204 may store a much larger quantity of files. The file monitor 108 may keep track of the open files on both or either the local storage device 204 and/or the external file system 206.

In one aspect, the file monitor 108 resides on the compute node 200. In another aspect, the file monitor 108 does not reside on the compute node 200, but is in operable communication with the compute node 200.

The file monitor 108 tracks activity associated with the set of files. For example, the file monitor 108 may track which files are being accessed, read from, written to, or the like. For instance, the file monitor 108 may determine that the first file 210 is not being utilized on the local storage device 204, but the second file 212 is being utilized on the local storage device 204. As an example, the file monitor 108 may further determine that a read operation has been performed on the second file 212. As another example, the file monitor 108 may determine that the third file 214 and the fourth file 216 are not being utilized by the compute node 200, but the fifth file 218 and the sixth file 220 are being utilized by the compute node 200.

Figure 3:
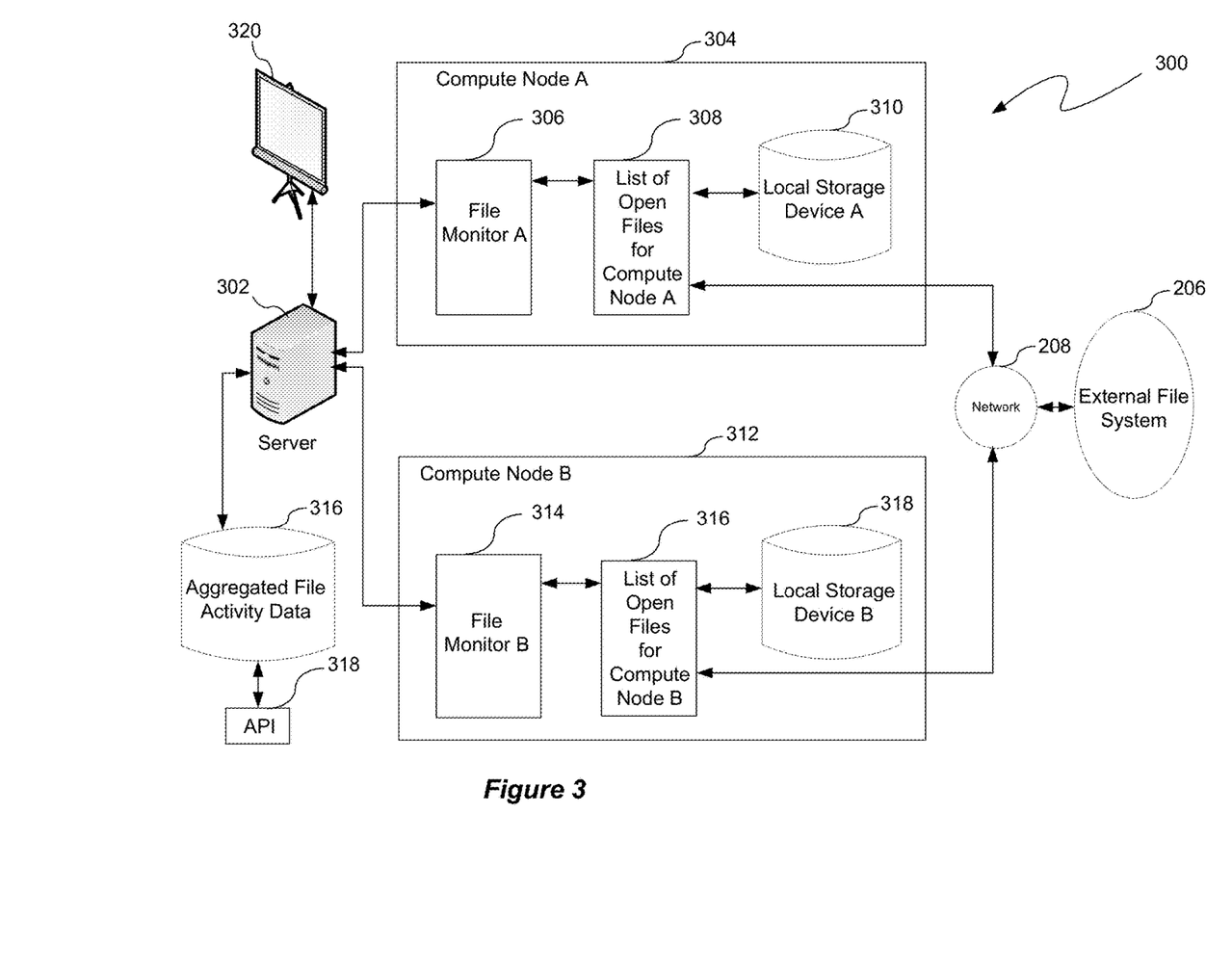
FIG. 3 illustrates a data aggregation configuration that may be utilized to aggregate data for file activity from a plurality of host compute nodes.

FIG. 3 illustrates a data aggregation configuration 300 that may be utilized to aggregate data for file activity from a plurality of host compute nodes. As an example, a server 302 may communicate with a plurality of file monitors that are each associated with a compute node. For instance, the server 302 may aggregate file activity from a compute node A 304 and a compute node B 312. A file monitor A 306 may monitor file activity at the compute node A 304. As an example, the file monitor A 306 may maintain a list 308 of open files for the compute node A 304. The list 308 of open files may include files that are locally stored in a local storage device A 310 and/or files that are externally stored in the external file system 206 via the network 208. Further, a file monitor B 314 may monitor file activity at the compute node B 312. As an example, the file monitor B 314 may maintain a list 316 of open files. The list 316 of open files may include files that are locally stored in a local storage device B 318 and/or files that are externally stored in the external file system 206 via the network 208.

Each of the file monitors 306, 314 may provide the file activity of the corresponding compute node 304, 312 to the server 302. Further, the server 302 may aggregate the file activity data. In one aspect, the server 302 stores the aggregated file activity data in a storage device 316. Further, an API 318 may access the aggregated file activity. In another aspect, the server 302 may display the file activity data on a display device 320. As an example, a user may view the aggregated file activity on the display device 320 and then perform operations on the aggregated file activity with the API 318.

Although a single external file system 206 is illustrated in FIG. 3, a plurality of external file systems may be utilized for any of the configurations provided for herein. For example, multiple NAS devices may be utilized for any of the configurations provided for herein.

Figure 4:
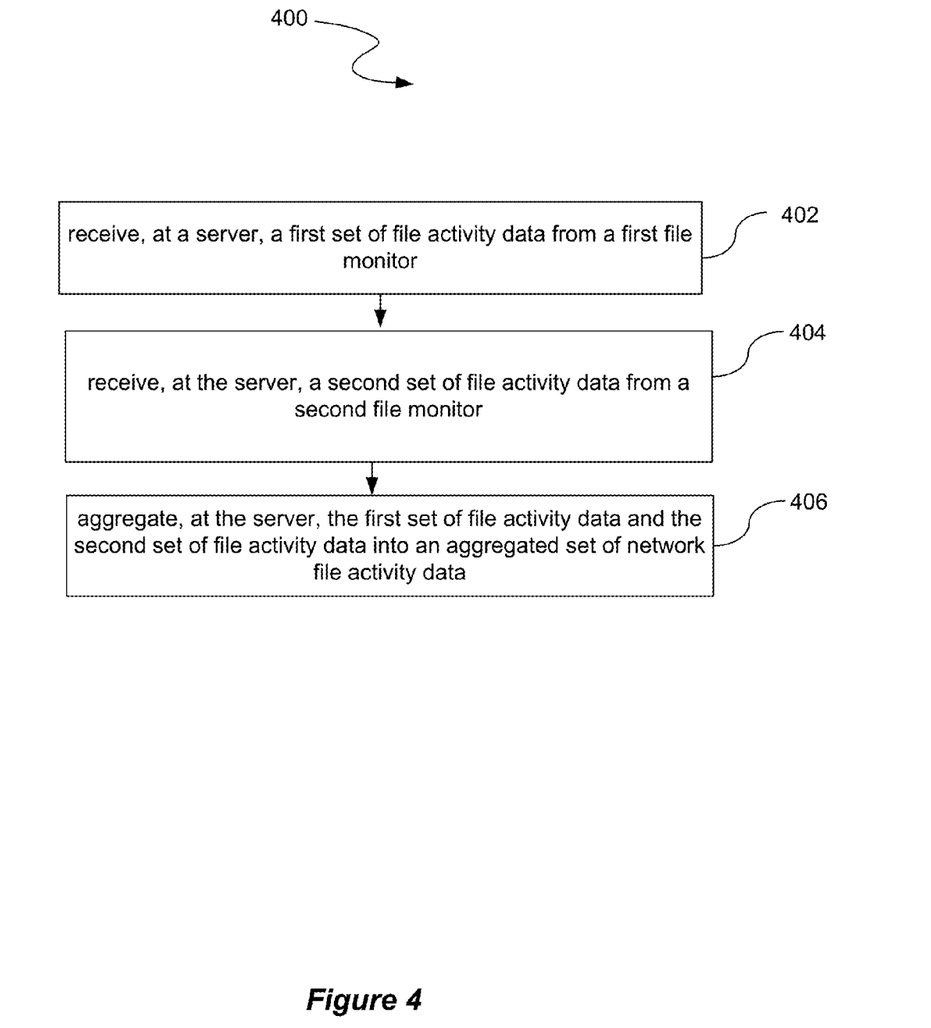
FIG. 4 illustrates a process that may be utilized by a server to aggregate file activity.

FIG. 4 illustrates a process 400 that may be utilized by a server to aggregate file activity. At a process block 402, the process 400 receives, at a server, a first set of file activity data from a first file monitor. The first set of file activity data indicates activity associated with a first set of files accessed at a first compute node in communication with a network. Further, at a process block 404, the process 400 receives, at the server, a second set of file activity data from a second file monitor. The second set of file activity data indicates activity associated with a second set of files accessed at a second compute node in communication with the network. In addition, at a process block 406, the process 400 aggregates, at the server, the first set of file activity data and the second set of file activity data into an aggregated set of network file activity data.

Figure 5:
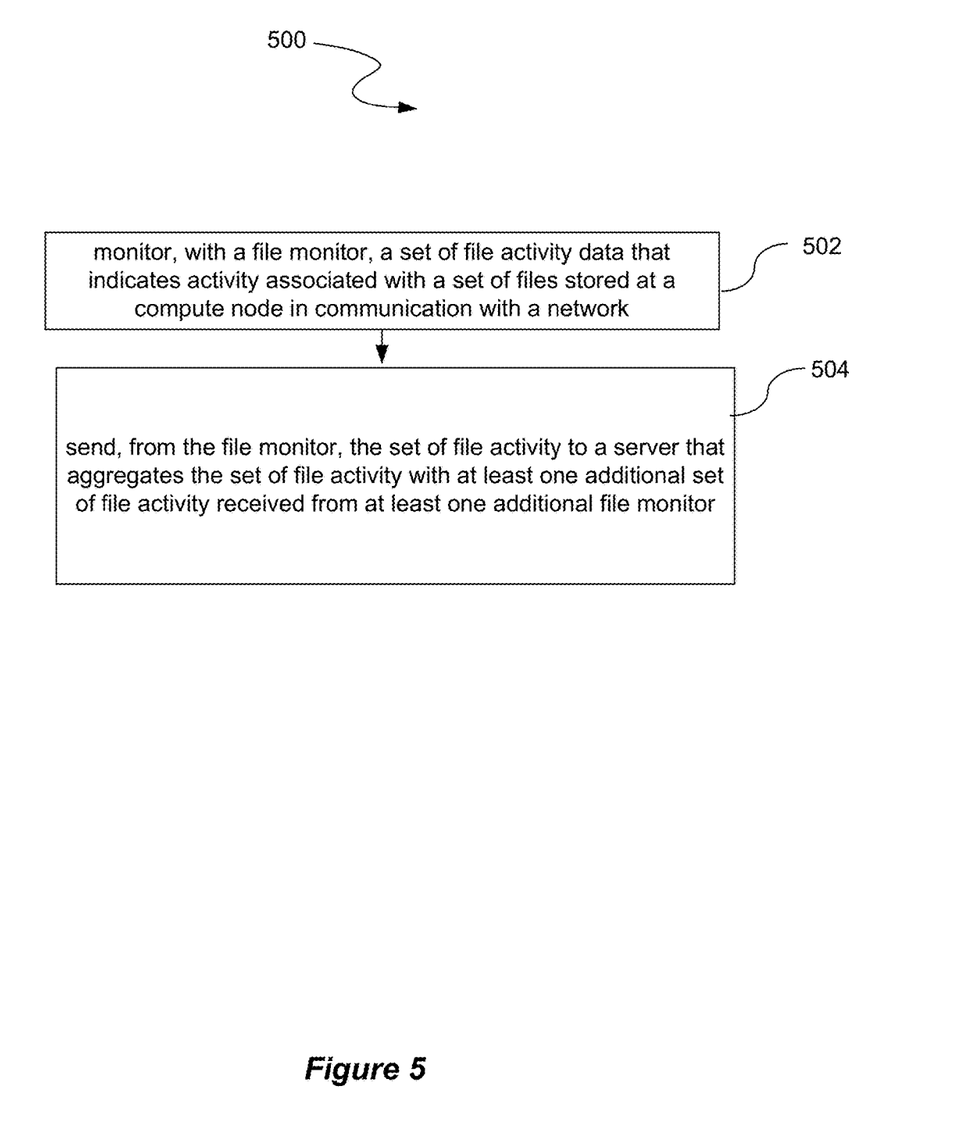
FIG. 5 illustrates a process that may be utilized by the file monitor to monitor file activity at the compute node.

FIG. 5 illustrates a process 500 that may be utilized by the file monitor 108 (FIG. 2) to monitor file activity at the compute node 200. At a process block 502, the process 500 monitors, with a file monitor 108, a set of file activity data that indicates activity associated with a set of files accessed at a compute node 200 in communication with a network. Further, at a process block 504, the process 500 sends, from the file monitor 108, the set of file activity to a server that aggregates the set of file activity with at least one additional set of file activity received from at least one additional file monitor. The at least one additional set of file activity indicates activity associated with an additional set of files accessed by at least one additional compute node.

Figure 6:
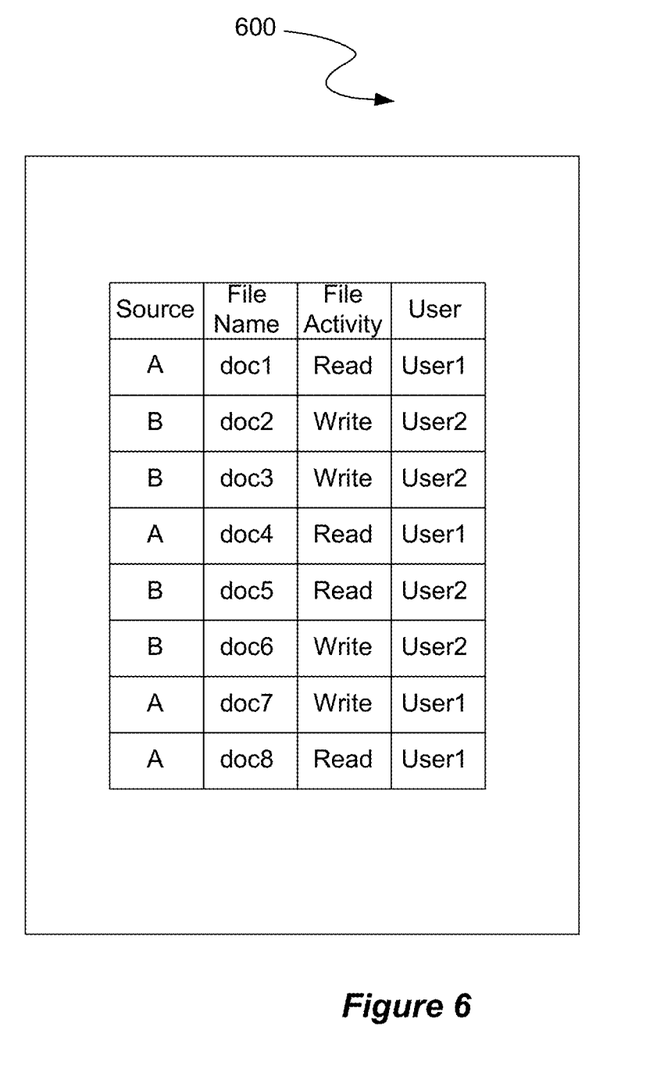
FIG. 6 illustrates an example of a graphical user interface ("GUI") that may be utilized to display the file activity data aggregated by the server illustrated in FIG. 3.

FIG. 6 illustrates an example of a GUI 600 that may be utilized to display the file activity data aggregated by the server 302 illustrated in FIG. 3. For example, the GUI 600 may indicate the source, file name, file activity, and user for each file in the aggregated file activity data. The source may indicate various compute nodes, e.g., the compute node A 306 and the compute node B 310 illustrated in FIG. 3. Further, the file name may indicate the name of each file or directory that is aggregated by the server 302. In addition, the type of file activity may be indicated. For example, a read operation or a write operation may be indicated. Further, the name of the user that is utilizing each file may be indicated. The information displayed in the GUI 600 is provided only for illustrative purposes as various other types of information may be displayed to a user to provide the user with a global view of network file activity.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above. For example, a computer may be a personal computer ("PC"), laptop, smartphone, tablet device, set top box, or the like.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A computer program product comprising a computer readable storage device having a computer readable program stored thereon, wherein the computer readable program when executed on a computer causes the computer to:
   receive, at a server, a first set of file activity data from a first file monitor, the first set of file activity data indicating activity associated with a first set of files accessed at a first compute node in communication with a network, the first compute node operating on a first computing platform, the server being distinct from the first compute node, the server being distinct from the first file monitor;
   receive, at the server, a second set of file activity data from a second file monitor, the second set of file activity data indicating activity associated with a second set of files accessed at a second compute node in communication with the network, the second compute node operating on a second computing platform, the second computing platform being distinct from the first computing platform, the server being distinct from the second compute node, the server being distinct from the second file monitor;
   aggregate, at the server, the first set of file activity data and the second set of file activity data into an aggregated set of network file activity data in a platform independent manner without reliance on the first computing platform or the second computing platform;
   determine, from the aggregated set of network file activity data, if a file is not open on the network; and
   automatically migrate, in real-time without the first file monitor and the second file monitor, the file from a first compute device to a second compute device after the determination, from the aggregated set of network file activity, that the file is not open on the network.

2. The computer program product of claim 1, wherein the computer is further caused to display, at a graphical user interface, the aggregated set of network file activity data.

3. The computer program product of claim 1, wherein the computer is further caused to provide the aggregated set of network file activity data to an Application Programming Interface.

4. The computer program product of claim 1, wherein the aggregated set of network file activity data includes an indication of file utilization.

5. The computer program product of claim 4, wherein the indication of file utilization includes a read operation.

6. The computer program product of claim 4, wherein the indication of file utilization includes a write operation.

7. The computer program product of claim 1, wherein the computer is further caused to automatically migrate a file in the first set of files from the first compute node to the second compute node if the aggregated set of network file activity data indicates that the file is not being utilized.

8. A method comprising:
   receiving, at a server, a first set of file activity data from a first file monitor, the first set of file activity data indicating activity associated with a first set of files accessed at a first compute node in communication with a network, the first compute node operating on a first computing platform, the server being distinct from the first compute node, the server being distinct from the first file monitor;
   receiving, at the server, a second set of file activity data from a second file monitor, the second set of file activity data indicating activity associated with a second set of files accessed at a second compute node in communication with the network, the second compute node operating on a second computing platform, the second computing platform being distinct from the first computing platform, the server being distinct from the second compute node, the server being distinct from the second file monitor;
   aggregating, at the server, the first set of file activity data and the second set of file activity data into an aggregated set of network file activity data in a platform independent manner without reliance on the first computing platform or the second computing platform;
   determining, from the aggregated set of network file activity data, if a file is not open on the network; and
   automatically migrating, in real-time without the first file monitor and the second file monitor, the file from a first compute device to a second compute device after the determination, from the aggregated set of network file activity, that the file is not open on the network.

9. The method of claim 8, wherein the computer is further caused to display, at a graphical user interface, the aggregated set of network file activity data.

10. The method of claim 8, wherein the computer is further caused to provide the aggregated set of network file activity data to an Application Programming Interface.

11. The method of claim 8, wherein the aggregated set of network file activity data includes an indication of file utilization.

12. The method of claim 11, wherein the indication of file utilization includes a read operation.

13. The method of claim 11, wherein the indication of file utilization includes a write operation.

14. The method of claim 8, further comprising automatically migrating a first file in the first set of files from the first compute node to the second compute node if the aggregated file activity data indicates that the first data set is not being utilized.

15. A system comprising:
   a server that receives a first set of file activity data from a first file monitor, receives a second set of file activity data from a second file monitor,
   aggregates the first set of file activity data and the second set of file activity data,
   determines, from the aggregated set of network file activity data, if a file is not open on the network in a platform independent manner without reliance on the first computing platform or the second computing platform, and
   automatically migrates, in real-time without the first file monitor and the second file monitor, the file from a first compute device to a second compute device after the determination, from the aggregated set of network file activity, that the file is not open on the network,
   the first set of file activity data indicating activity associated with a first set of files accessed at a first compute node in communication with a network,
   the second set of file activity data indicating activity associated with a second set of files accessed at a second compute node in communication with the network, the first compute node operating on a first computing platform, the second compute node operating on a second computing platform, the second computing platform being distinct from the first computing platform, the server being distinct from the first compute node, the server being distinct from the first file monitor, the server being distinct from the second compute node, the server being distinct from the second file monitor.

16. A computer program product comprising a computer readable storage device having a computer readable program stored thereon, wherein the computer readable program when executed on a computer causes the computer to:

monitor, with a first file monitor, a first set of file activity data from a first file monitor, the first set of file activity data indicating activity associated with a first set of files accessed at a first compute node in communication with a network, the first compute node operating on a first computing platform;

monitor, with a second file monitor, a second set of file activity data from a second file monitor, the second set of file activity data indicating activity associated with a second set of files accessed at a second compute node in communication with the network, the second compute node operating on a second computing platform;

send, from the first file monitor, the first set of file activity data to a server; and send, from the second file monitor, the second set of file activity data to the server, aggregate, at the server, the first set of file activity data and the second set of file activity data into an aggregated set of network file activity data in a platform independent manner without reliance on the first computing platform or the second computing platform;

determine, from the aggregated set of network file activity data, if a file is not open on the network; and automatically migrate, in real-time without the first file monitor and the second file monitor, the file from a first compute device to a second compute device after the determination, from the aggregated set of network file activity, that the file is not open on the network;

wherein the server is distinct from the first compute node, the second compute node, the first file monitor, and the second file monitor.

17. The computer program product of claim 16, wherein the first set of file activity data and the second set of file activity data include an indication of file utilization.

18. The computer program product of claim 17, wherein the indication of file utilization includes a read operation.

19. The computer program product of claim 17, wherein the indication of file utilization includes a write operation.

20. The computer program product of claim 16, wherein the first file monitor is executed within the first compute node, and the second file monitor is executed within the second compute node.

21. The computer program product of claim 16, wherein the first file monitor is executed externally to the first compute node, and the second file monitor is executed externally to the second compute node.

22. A method comprising:

monitoring, with a first file monitor, a first set of file activity data from a first file monitor, the first set of file activity data indicating activity associated with a first set of files accessed at a first compute node in communication with a network, the first compute node operating on a first computing platform;

monitoring, with a second file monitor, a second set of file activity data from a second file monitor, the second set of file activity data indicating activity associated with a second set of files accessed at a second compute node in communication with the network, the second compute node operating on a second computing platform;

sending, from the first file monitor, the first set of file activity data to a server; and sending, from the second file monitor, the second set of file activity data to the server, aggregate, at the server, the first set of file activity data and the second set of file activity data into an aggregated set of network file activity data in a platform independent manner without reliance on the first computing platform or the second computing platform;

determine, from the aggregated set of network file activity data, if a file is not open on the network; and automatically migrate, in real-time without the first file monitor and the second file monitor, the file from a first compute device to a second compute device after the determination, from the aggregated set of network file activity, that the file is not open on the network;

wherein the server is distinct from the first compute node, the second compute node, the first file monitor, and the second file monitor.

23. The method of claim 22, wherein the first set of file activity data and the second set of file activity data include an indication of file utilization.

24. The method of claim 23, wherein the indication of file utilization includes a read operation.

25. The method of claim 23, wherein the indication of file utilization includes a write operation.

26. The method of claim 22, wherein the first file monitor is executed within the first compute node, and the second file monitor is executed within the second compute node.

27. The method of claim 22, wherein the first file monitor is executed externally to the first compute node, and the second file monitor is executed externally to the second compute node.

28. A system comprising:

a hardware processor that monitors, with a first file monitor, a first set of file activity data from a first file monitor, monitors, with a second file monitor, a second set of file activity data from a second file monitor, sends, from the first file monitor, the first set of file activity data to a server, and sends, from the second file monitor, the second set of file activity data to a server, the first set of file activity data indicating activity associated with a first set of files accessed at a first compute node in communication with a network, the first compute node operating on a first computing platform, the second set of file activity data indicating activity associated with a second set of files accessed at a second compute node in communication with the network, the second compute node operating on a second computing platform, aggregate, at the server, the first set of file activity data and the second set of file activity data into an aggregated set of network file activity data in a platform independent manner without reliance on the first computing platform or the second computing platform;

determine, from the aggregated set of network file activity data, if a file is not open on the network; and automatically migrate, in real-time without the first file monitor and the second file monitor, the file from a first compute device to a second compute device after the determination, from the aggregated set of network file activity, that the file is not open on the network;

wherein the server is distinct from the first compute node, the second compute node, the first file monitor, and the second file monitor.

\* \* \* \* \*